United States Patent [19]

Hoyle et al.

[11] Patent Number: 4,862,991
[45] Date of Patent: Sep. 5, 1989

[54] SONIC WELL LOGGING TOOL TRANSMITTER

[75] Inventors: David C. Hoyle, Houston; Albert H. Wignall, Friendswood; James J. Walulik, Houston, all of Tex.

[73] Assignee: Schlumberger Technology Corporation, Houston, Tex.

[21] Appl. No.: 243,852

[22] Filed: Sep. 13, 1988

[51] Int. Cl.$^4$ .......................... G01V 1/14; G01V 1/40
[52] U.S. Cl. ..................................... 181/106; 367/31; 367/911
[58] Field of Search .................... 367/31, 75, 911, 912; 181/106; 310/17

[56] References Cited

U.S. PATENT DOCUMENTS

| | | | |
|---|---|---|---|
| 2,451,797 | 10/1948 | Blanchard | 367/31 |
| 3,364,463 | 7/1966 | Pardue . | |
| 3,381,267 | 4/1968 | Cubberly . | |
| 3,504,757 | 4/1970 | Chapman . | |
| 3,978,939 | 9/1976 | Lee . | |
| 4,207,961 | 6/1980 | Kitsunezaki . | |
| 4,312,052 | 1/1982 | Cooper . | |
| 4,383,591 | 5/1983 | Ogura | 181/106 |
| 4,606,014 | 8/1986 | Windbow . | |
| 4,649,525 | 3/1987 | Angona . | |
| 4,698,792 | 10/1987 | Kurkigjan . | |
| 4,703,460 | 10/1987 | Kurtijan . | |
| 4,751,688 | 6/1988 | Paulsson | 367/75 |

FOREIGN PATENT DOCUMENTS 0031989 7/1980 Japan .

OTHER PUBLICATIONS

The Technical Review, vol. 35, No. 3, "New Ways to Make Shear Waves".
Borehole Geophysics 2, "Development of a Suspension PS Logging System's By. Kenji Tanaka, Shingo Inoue and Kimio Ogura", OMO Corp. Japan.
Geophysics, vol. 45, No. 10 (Oct. 1980): P. 1489-1506 23 FIGS. I Table "A New Method for Shear Wave Logging", By: Choro Kitsunezaki.
Butsuri-Tanko (Geophysical Exploration) vol. 36, No. 6 (1983), Receivers and Sources in the Suspension Type Shear Wave Logging by: Choro Kitsunezaki.

*Primary Examiner*—Nelson Moskowitz
*Attorney, Agent, or Firm*—Henry N. Garrana; John H. Bouchard

[57] ABSTRACT

A transmitter for a sonic wall logging tool contains a piston, the plane of the piston being disposed along the longitudinal axis of the tool. The piston moves, in its entirety, transversely with respect to the tool when an alternating current flows in two coils disposed in magnetic fields created by two mangets. Sonic positive pressure waves are created on one side of the piston, and sonic negative pressure waves are created on the other side of the piston. Shear waves are created in the formation, a positive shear wave being created in the formation on one side of the tool, and a negative shear wave being created in the formation on the other side of the tool.

10 Claims, 4 Drawing Sheets

FIG.2 MONOPOLE

FIG.3 DIPOLE

SONIC WELL LOGGING TOOL TRANSMITTER

BACKGROUND OF THE INVENTION

The subject matter of the present invention relates to well logging tools, and in particular, to a sonic transmitter for a sonic well logging tool.

Well logging tools are used in boreholes of oil wells for the purpose of determining if oil exists in a formation of the borehole. Some well logging tools are sonic in nature, in that they transmit a sonic pressure wave into the formation and receive the sonic pressure wave from the formation. The received sonic pressure wave is analyzed for the purpose of determining if oil exists in the formation. The sonic well logging tools include a transmitter for transmitting the sonic pressure wave into the formation. One such transmitter is discussed in an article entitled "Development of a Suspension PS Logging System's Seismic Source for Hard Ground", by Kenji Tanaka, Shingo Inoue, and Kimio Ogura, of OYO Corp, Japan (hereinafter referred to as the "Tanaka transmitter"). The Tanaka transmitter is used in subsoil logging for the construction industry, not in well logging. Furthermore, the Tanaka transmitter, being an air filled device, is capable of logging only shallow, low pressure boreholes. Furthermore, the Tanaka transmitter uses fixed solenoid coils to drive a metal hammer. The hammer impacts the ID of a thin walled cylindrical sleeve surrounding the sonde body, sending a pressure pulse out into the borehole fluid. This system has two disadvantages: the dipole radiation pattern from the struck sleeve is not symmetrical and, as a result, the Tanaka transmitter will produce a large, undesirable monopole component; the frequency response of the system is not controllable and is likely to be dominated by the resonant frequencies of the sleeve. Another such transmitter is discussed in a article entitled "A new method for shear-wave logging", by Choro Kitsunezaki, published in GEOPHYSICS dated October 1980; in an article entitled "Receivers and Sources in the Suspension Type Shear Wave Logging", by Choro Kitsunezaki, published in GEOPHYSICAL EXPLORATION dated 1983; and in U.S. Pat. No. 4,207,961 to Kitsunezaki (hereinafter referred to as the "Kitsunezaki transmitter"). The piston in the Kitsunezaki transmitter contains two coils, which are activated sequentially in time, rather than simultaneously. The Kitsunezaki transmitter uses one coil to drive the piston in one direction, the other coil to drive the piston in the opposite direction in order to prevent the magnetic field produced by the coils from opposing the permanent magnet's magnetic field and demagnetizing the permanent magnet. Further, the Kitsunezaki transmitter piston surrounds a centrally disposed permanent magnet, which presents three major disadvantages: since the Kitsunezaki magnet is disposed inboard of the coils, the magnet volume must be very small for a given package size thereby maintaining the flux in the magnet gap at a smaller level; the Kitsunezaki transmitter piston mass must be high and, as a result, given a piston area and a piston resonance frequency, Kitsunezaki must carry the mass of TWO driving plates and of the connecting rod which must join the two driving plates of the piston; since the Kitsunezaki piston is hollow, it carries a large, dead (acoustically non-radiating) internal fluid mass. The Kitsunezaki piston has two driving plates, each with an inwardly directed face, and a connecting rod passing through a close fitting hole in the magnet. Thus, the Kitsunezaki transmitter has a large internal area subject to fluid drag and squeeze film damping. It is likely that the Kitsunezaki transmitter will be overdamped.

SUMMARY OF THE INVENTION

Accordingly, it is a primary object of the present invention to produce a transmitter for a sonic well logging tool which avoids the disadvantages of the sonic transmitters of the prior art.

It is a further object of the present invention to produce a transmitter for a sonic well logging tool which develops a symmetrical dipole radiation pattern, having a flat sensitivity over a wide frequency range.

It is a further object of the present invention to produce a transmitter for a sonic well logging tool which contains two coils, activated simultaneously, for the purpose of doubling the driving force on the piston, and a magnet having a very high coercive force that cannot be demagnetized by the magnetic field generated by the coils.

It is a further object of the present invention to produce a transmitter for a sonic well logging tool having a centrally disposed piston comprised of a single driving plate, with no connecting rods and no acoustically non-radiating fluid mass.

It is a further object of the present invention to produce a transmitter for a sonic well logging tool having a small piston area subject to fluid drag and almost no regions subject to squeeze film damping thereby producing an optimal amount of damping.

These and other objects of the present invention are accomplished by designing a transmitter for a sonic well logging tool which comprises a single piston consisting of a disc, the plane of the disc being disposed on a longitudinal axis through the center of the tool; a toroidally shaped magnet centrally disposed around a periphery of the piston disc; a first coil disposed around the periphery of the piston disc, facing one side of the disc and centered between the north pole and the south pole of the magnet; and a second coil disposed around the periphery of the piston disc, facing the other side of the disc and centered between the north pole and the south pole of the magnet. A current flows in both coils simultaneously, in the same direction, producing a dual-force on the piston disc which moves the entire piston disc an incremental distance in a direction perpendicular to the plane of the disc. The force is termed "dual-force" because of the two forces created by the currents flowing in the two coils which are disposed intermediate the north and sole poles of the magnet.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 2 illustrates the results produced in the formation of a borehole by a sonic monopole tool;

FIG. 3 illustrates the results produced in the formation of a borehole by the sonic dipole tool according to the present invention;

DETAILED DESCRIPTION OF THE PREFERRED EMBODIMENT

Figure 1:
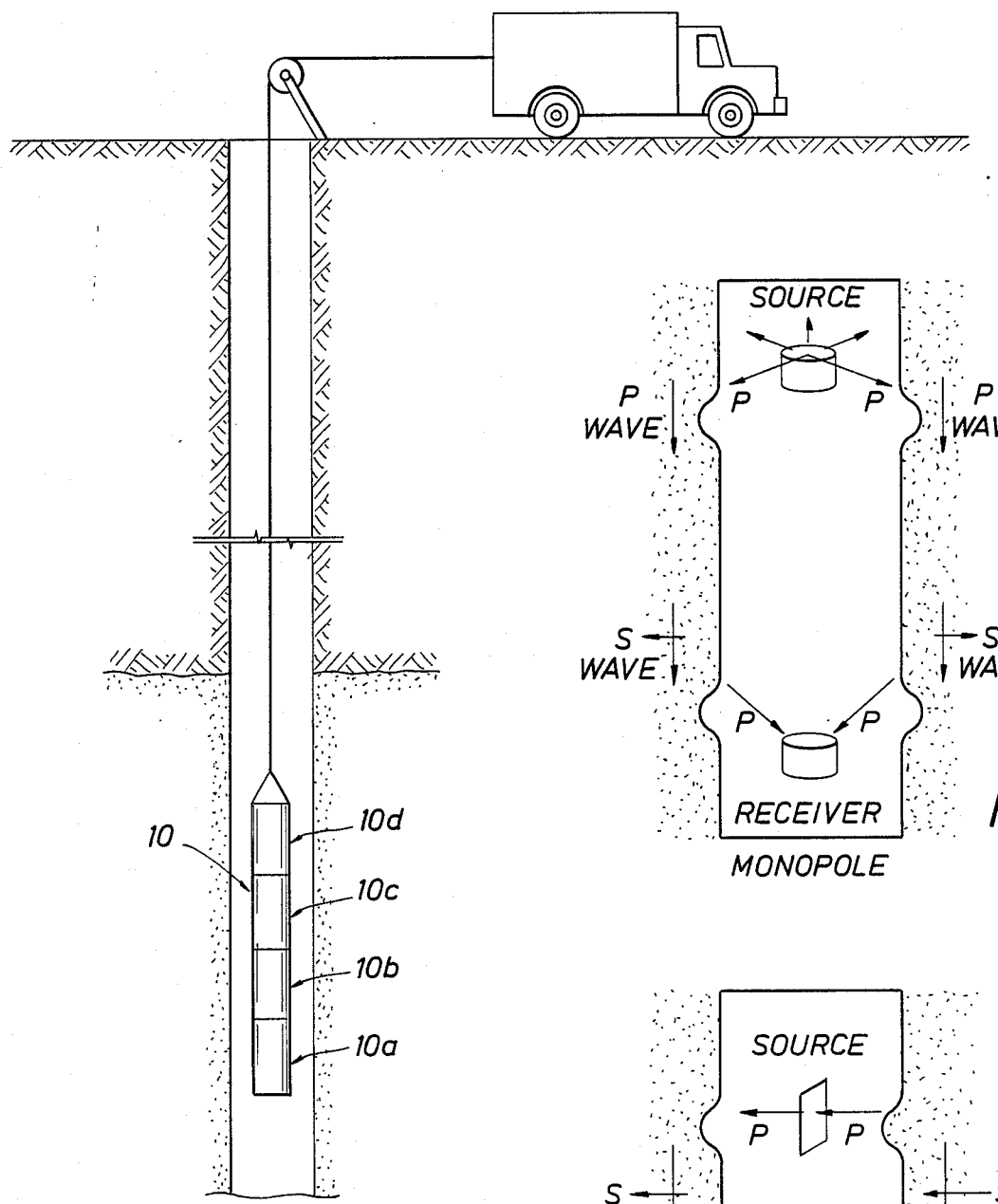
FIG. 1 illustrates the sonic well logging tool disposed in the borehole of an oil well.

Referring to FIG. 1, a well logging truck lowers a sonic dipole tool 10 into the borehole of an oil well. The sonic dipole tool comprises a transmitter 10a, a Sonic Isolation Joint (SIJ) 10b, a receiver 10c and an electronics cartridge 10d.

Referring to FIG. 2, a functional description of a sonic monopole well logging tool is illustrated. In FIG. 2, the sonic monopole tool transmitter produce positive pressure waves via volumetric expansion and contraction. Pressure and shear waves are generated in the formation, as illustrated, these pressure and shear waves propagating longitudinally along the axis of the borehole.

Referring to FIG. 3, a functional description of the sonic dipole well logging tool of FIG. 1 is illustrated. In FIG. 3, a moving plate (representing an asymmetric sound source) produces a positive pressure wave on one side of the tool and a negative pressure wave on the other side of the tool. No net volume change is produced. A positive shear wave propagates longitudinally on one side of the borehole and a negative shear wave propagates longitudinally on the other side of the borehole.

Figure 4A:
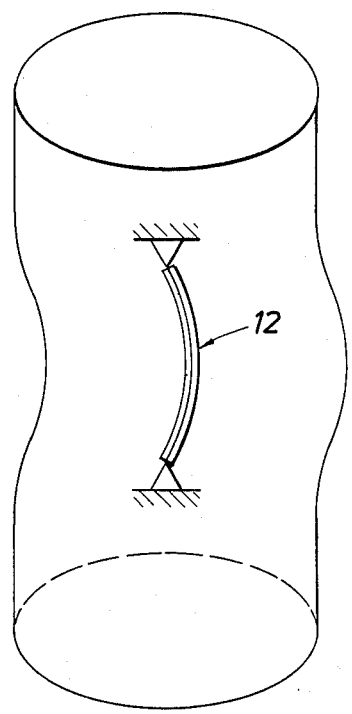
FIG. 4a illustrates the function of a bimorph sonic transmitter.
Figure 4B:
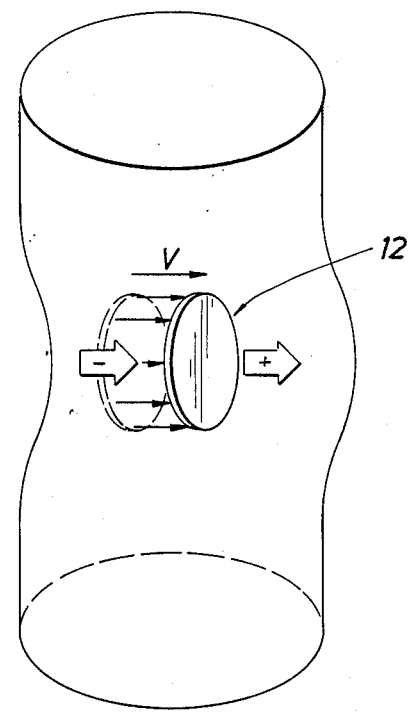
FIG. 4b illustrates the function of an electrodynamic sonic transmitter in accordance with the present invention.

Referring to FIGS. 4a and 4b, the sonic dipole tool of FIG. 3 may include either a bimorph transmitter or an electrodynamic transmitter. FIG. 4a illustrates the function of a bimorph transmitter, wherein the piston 12 is fixed at both ends. Therefore, when a voltage is applied to the piezoceramic bimorph, the bimorph flexes at its center, as illustrated in FIG. 4a. However, FIG. 4b illustrates the function of an electrodynamic transmitter, wherein the piston 12 moves in its entirety, in response to a current simultaneously flowing in both coils 10a2,10a4, as illustrated in FIG. 4b, because the piston is not firmly fixed at its ends as illustrated in FIG. 4a. Rather, in FIG. 4b, the piston 12 is connected, at its ends and at selected points around its periphery, to rubber spring 10a7 which flexes when a current flows through coils 10a2,10a4. In FIG. 4b, a positive pressure is created in the region to the right of the piston 12, as indicated by the positive arrow, whereas a negative pressure is created in the region to the left of the piston 12, as indicated by the negative arrow when the current simultaneously flows in both coils 10a2,10a4.

Figure 5:
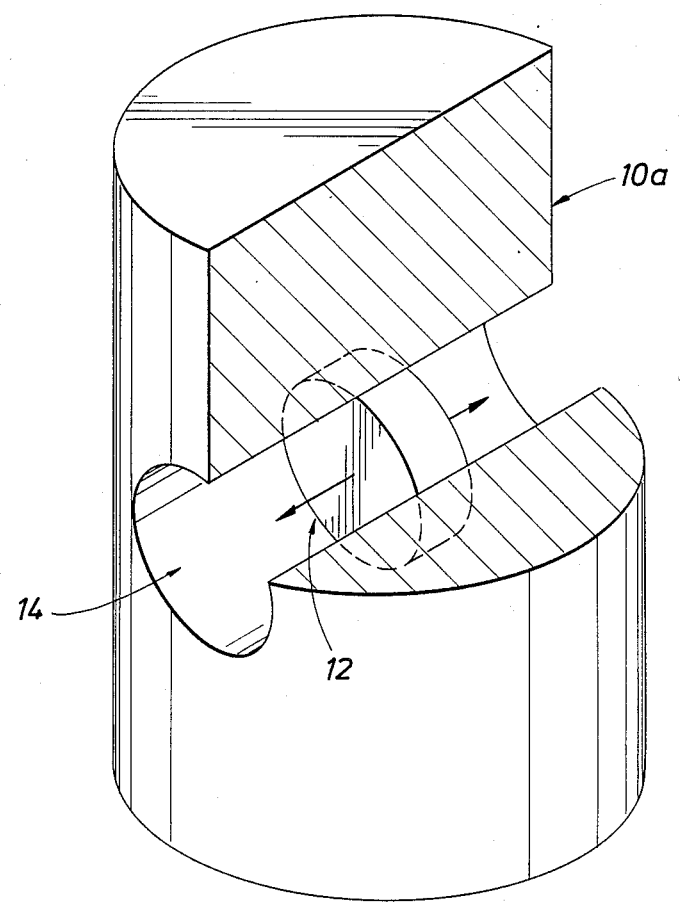
FIG. 5 illustrates the electrodynamic sonic transmitter of FIG. 4b in a sonic well logging tool environment.

Referring to FIG. 5, a three dimensional view of the sonic transmitter of the present invention is illustrated. In FIG. 5, the piston 12 is disposed in an aperture 14. As will be illustrated in the description below, the piston 12 moves, in its entirety, within the aperture 14 in response to a force created on the piston, the force being created in response to a current flowing in a coil, or coils, disposed in a magnetic field. The piston 12 is disposed in the aperture 14 of a sonic transmitter 10a disposed in a borehole of an oil well.

Figure 6:
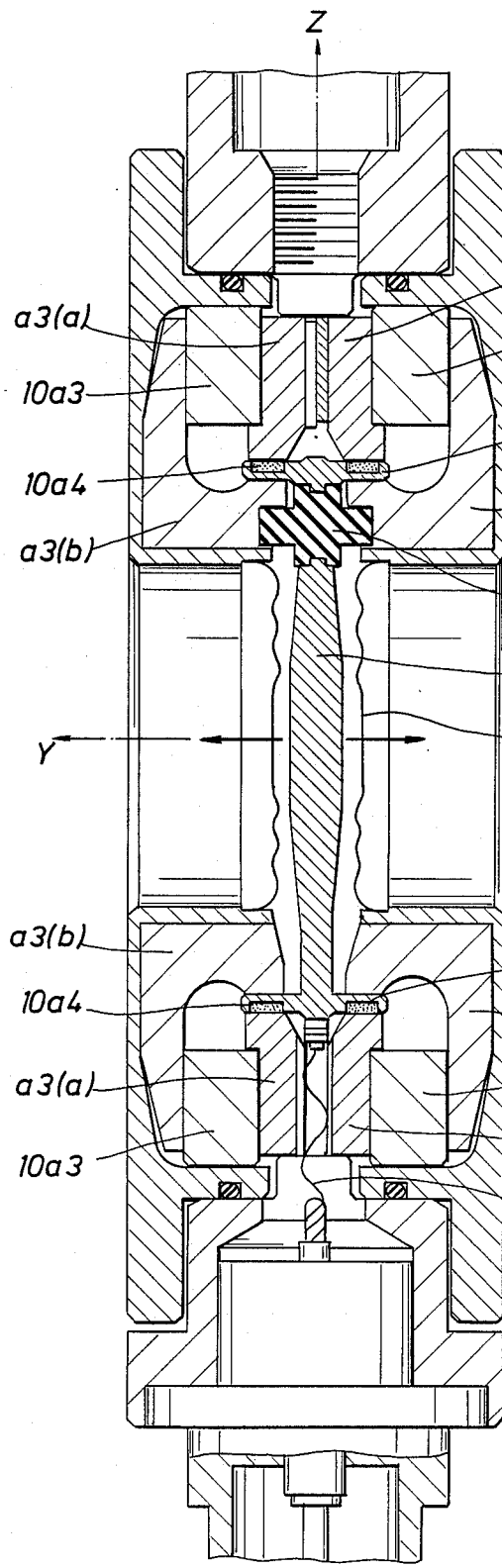
FIG. 6 illustrates a longitudinal cross sectional view of the electrodynamic transmitter of FIGS. 4b and 5, according to the present invention.

Referring to FIG. 6, a first embodiment of the sonic transmitter 10a, in accordance with the present invention, is illustrated. In FIG. 6, the transmitter 10a includes a first magnet 10a1 having a north pole a1(a) and a south pole a1(b); a first coil 10a2 disposed between the north pole and the south pole of the first magnet 10a1; a second magnet 10a3 having a north pole a3(a) and a south pole a3(b); a second coil 10a4 disposed between the north pole and the south pole of the second magnet 10a3; a rigid piston 10a5; a flexible diaphram 10a6; a rubber spring 10a7; and wires 10a8 connected to the first coil 10a2 and the second coil 10a4. Wires 10a8 are connected to both the first and second coils 10a2, 10a4 because both coils are energized simultaneously by a current originating from a separate power source.

Figure 7:
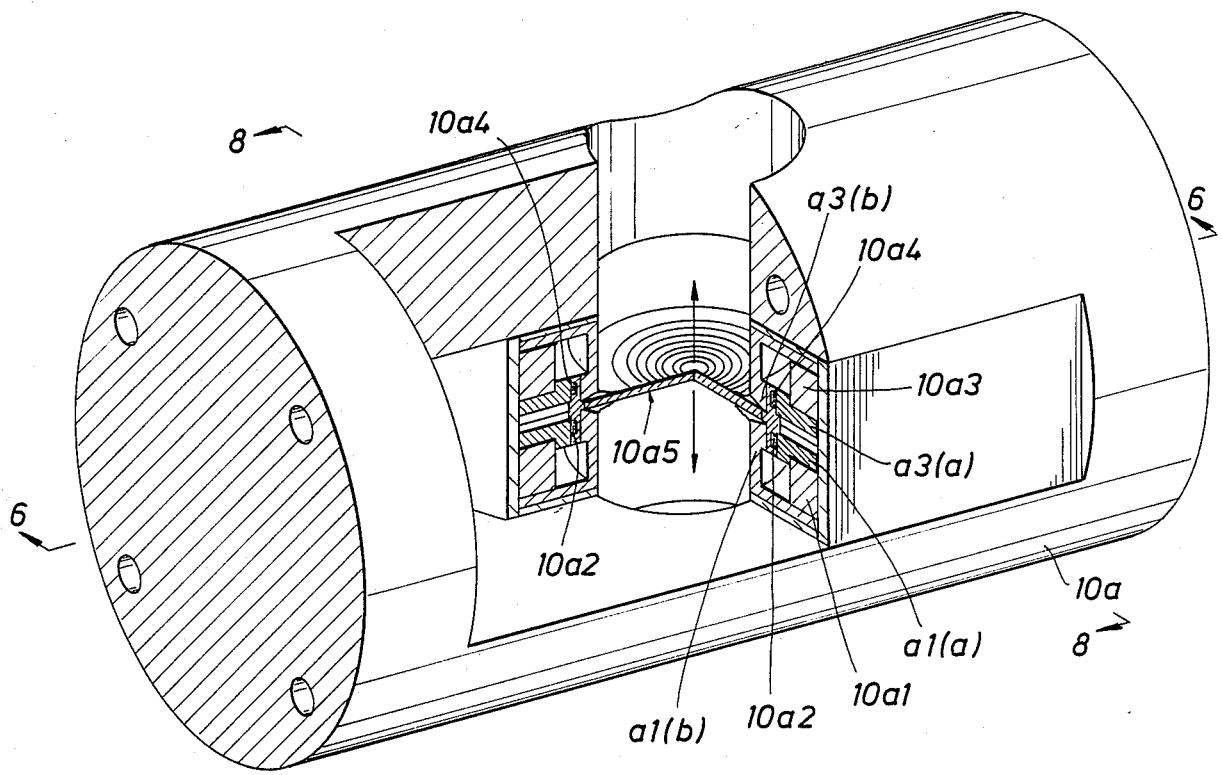
FIG. 7 illustrates a three dimensional view of the electrodynamic sonic transmitter shown in FIG. 6, according to the present invention.

Referring to FIG. 7, a three dimensional view of the transmitter 10a of FIG. 6 is illustrated. The FIG. 6 transmitter is a side view taken along section lines A—A of FIG. 7. In FIG. 7, a section of the transmitter has been cut away, in the drawing, to show the piston 10a5, and the two coils 10a2, 10a4 disposed between the north and south poles of magnets 10a1, 10a3. The same numerals shown in FIG. 6 are also shown in FIG. 7.

Figure 8:
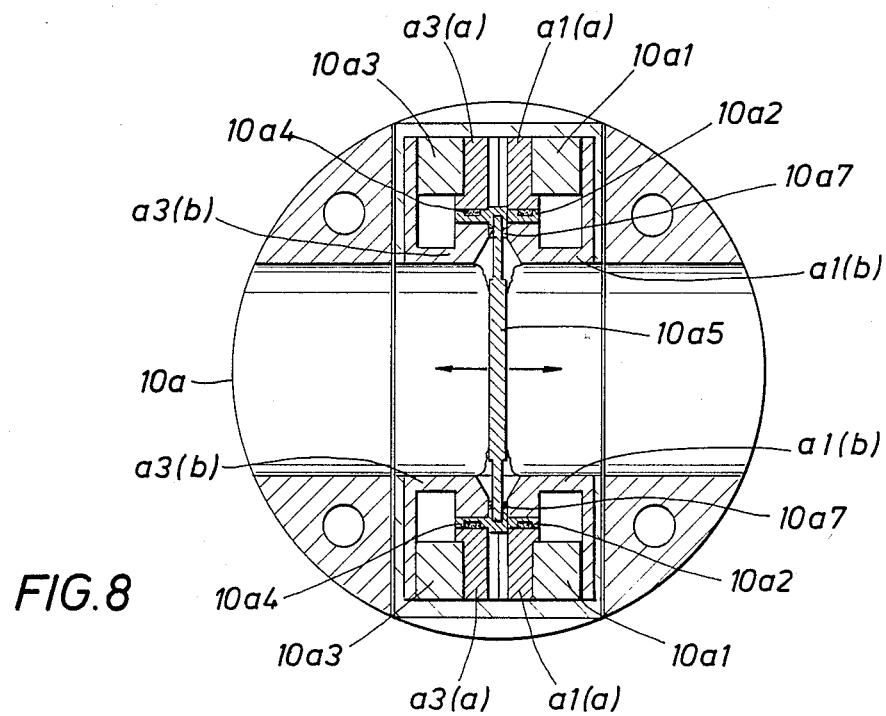
FIG. 8 illustrates a transverse cross sectional view of the electrodynamic sonic transmitter of FIGS. 6 and 7.

Referring to FIG. 8, a cross-section of the sonic transmitter of FIG. 6, taken along section lines B—B of FIG. 7, is illustrated. The same numerals as shown in FIGS. 6 and 7 are used in FIG. 8.

Figure 9:
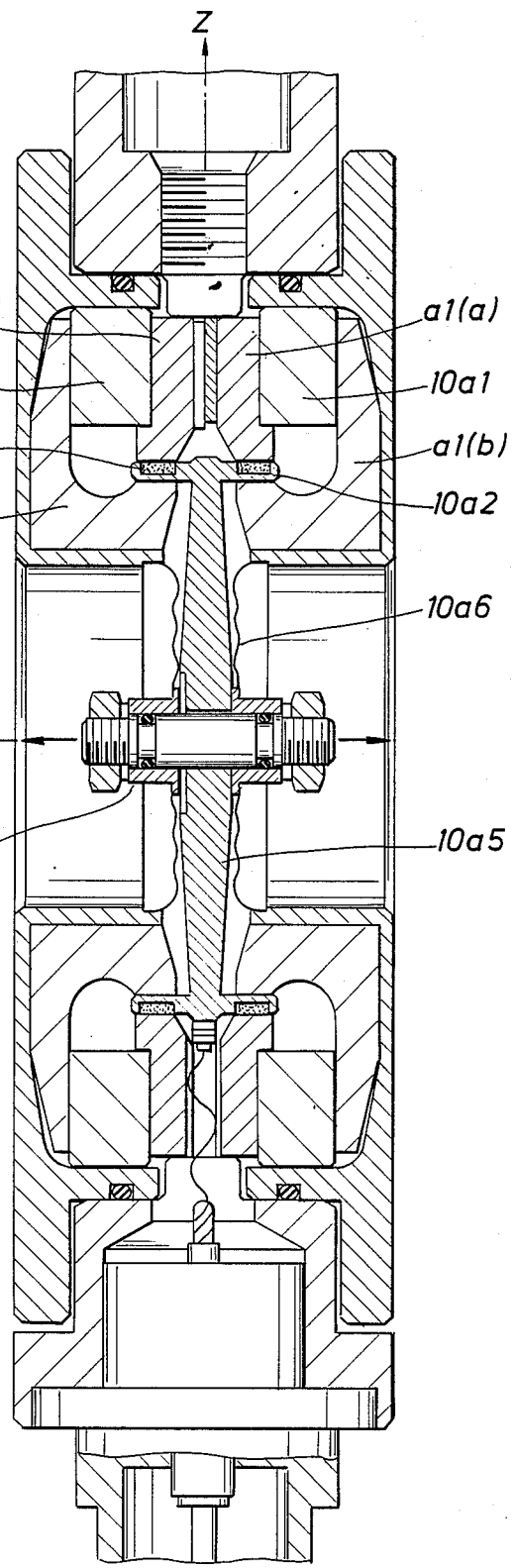
FIG. 9. illustrates a longitudinal cross sectional view of another embodiment of the electrodynamic transmitter, of FIGS. 4b and 5, according to the present invention.

Referring to FIG. 9, another embodiment of the transmitter of FIG. 6 is illustrated, this embodiment further including a piston centering and sealing assembly 10a9. Otherwise, the transmitter of FIG. 9 is the same as the transmitter of FIG. 6.

A functional description of the sonic transmitter 10a will be set forth in the following paragraphs with reference to FIGS. 6–9 of the drawings.

The transmitter 10a of the sonic well logging tool of FIGS. 6–9 comprises a single piston 10a5 (not connected at its ends as shown in FIG. 4a) consisting of a disc, the plane of the disc being disposed on a longitudinal axis through the center of the tool; a toroidally shaped magnet 10a1,10a3 centrally disposed around a periphery of the piston disc consisting of north poles a1(a),a3(a) and south poles a1(b),a3(b); a first coil 10a2 disposed around the periphery of the piston disc, facing one side of the disc and centered between one of the north poles and south poles of the magnet; and a second coil 10a4 disposed around the periphery of the piston disc, facing the other side of the disc and centered between the other of the north poles and the south poles of the magnet. A current flows in both coils simultaneously, in the same direction, producing a dual-force on the piston disc which moves the entire piston disc an incremental distance in a direction perpendicular to the plane of the disc. The force is termed "dual-force" because of the two forces created by the currents flowing in the two coils which are disposed intermediate the north and sole poles of the magnet.

An alternating current flows in wire 10a8. Since wire 10a8 is connected to both coils 10a2 and 10a4, the alternating current flows in both coils simultaneously. Since the coils are each disposed in a magnetic field created by magnets 10a1 and 10a3, a force is created on piston 10a5, the force being a dual-force, since there are two coils and two magnets creating the two forces. As a result, the piston moves, in its entirety, transversely between right and left, as shown in the drawing of FIG. 6. The piston 10a5 moves in the manner shown by piston 12 in FIGS. 4b and 5 of the drawings. The piston 10a5 does not flex, as shown in FIG. 4a of the drawings, because the piston 10a5 is not firmly fixed at its ends; rather, the piston is connected at its ends to a rubber spring 10a7 which flexes when the dual force is exerted on the piston. The formation of the borehole is affected in the manner shown in FIG. 3 of the drawings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A transmitter for a sonic well logging tool, said tool having a longitudinal axis, comprising: a piston disposed along the longitudinal axis of said tool; a magnet disposed around the periphery of said piston, said magnet having a north pole and a south pole; a first coil disposed between the north pole and the south pole of said magnet on one side of said piston; and a second coil disposed between the north pole and the south pole of said magnet on the other side of said piston.

2. The transmitter of claim 1, wherein said first coil and said second coil are both connected to a single power source.

3. The transmitter of claim 2, wherein said piston comprises a disc lying in a plane which is disposed along the longitudinal axis of said tool.

4. The transmitter of claim 3, wherein said piston is not integrally fixed to said tool at its ends.

5. The transmitter of claim 4, wherein said power source energizes said first coil and said second coil simultaneously by flowing a current through both of the coils simultaneously.

6. The transmitter of claim 5, wherein said piston moves, in its entirety, in a direction transverse to the longitudinal axis of said tool in response to the flowing of said current through both of the coils simultaneously.

7. A method of operating a transmitter in a sonic well tool, said well tool including a piston, a first coil disposed on one side of said piston, and a second coil disposed on the other side of said piston, comprising the steps of:
   simultaneously energizing both said first coil and said second coil; and
   moving said piston, in its entirety, in a direction substantially transverse to a longitudinal axis of said tool in response to the energizing step.

8. The method of claim 7, wherein the energizing step comprises the step of flowing a current through both said first coil and said second coil simultaneously.

9. The method of claim 7, wherein said piston is not integrally attached to said tool along a periphery thereof, the entire surface of said piston, including said periphery, moving in said direction in response to the energizing step.

10. The transmitter of claim 1, wherein said tool has a cross-sectional center and said longitudinal axis is located at the cross-sectional center of said tool, the piston being disposed on said longitudinal axis located at said cross-sectional center.

* * * * *